(12) United States Patent
Remes et al.

(10) Patent No.: US 11,610,768 B2
(45) Date of Patent: Mar. 21, 2023

(54) METHODS AND APPARATUS FOR HIGH SPEED MASS SPECTROMETRY

(71) Applicant: Thermo Finnigan LLC, San Jose, CA (US)

(72) Inventors: Philip M. Remes, Livermore, CA (US); Jae C. Schwartz, Gilroy, CA (US); Alexander A. Makarov, Bremen (DE)

(73) Assignee: Thermo Finnigan LLC, San Jose, CA (US)

( * ) Notice: Subject to any disclaimer, the term of this patent is extended or adjusted under 35 U.S.C. 154(b) by 169 days.

(21) Appl. No.: 17/326,956

(22) Filed: May 21, 2021

(65) Prior Publication Data

US 2021/0375611 A1    Dec. 2, 2021

Related U.S. Application Data

(60) Provisional application No. 63/029,866, filed on May 26, 2020.

(51) Int. Cl.
| | |
|---|---|
| *G01N 27/623* | (2021.01) |
| *H01J 49/40* | (2006.01) |
| *H01J 49/42* | (2006.01) |
| *H01J 49/00* | (2006.01) |

(52) U.S. Cl.
CPC ........ *H01J 49/4215* (2013.01); *G01N 27/623* (2021.01); *H01J 49/0031* (2013.01); *H01J 49/0045* (2013.01); *H01J 49/40* (2013.01); *H01J 49/401* (2013.01); *H01J 49/4265* (2013.01)

(58) Field of Classification Search
CPC ............... H01J 49/4215; H01J 49/0031; H01J 49/0045; H01J 49/401; H01J 49/004; H01J 49/40; H01J 49/4265; G01N 27/623

USPC ......................................................... 250/287
See application file for complete search history.

(56) References Cited

U.S. PATENT DOCUMENTS

| | | |
|---|---|---|
| 5,905,258 A | 5/1999 | Clemmer et al. |
| 7,077,944 B2 | 7/2006 | Clemmer |
| 9,728,383 B2 | 8/2017 | Green et al. |

(Continued)

OTHER PUBLICATIONS

Henderson et al., "ESI/Ion Trap/Ion Mobility/Time-of-Flight MassSpectrometry for Rapid and Sensitive Analysis of Biomolecular Mixtures", Anal. Chem. 1999, 71 (2), pp. 291-301.

(Continued)

*Primary Examiner* — Kiet T Nguyen
(74) *Attorney, Agent, or Firm* — Thomas F. Cooney

(57) ABSTRACT

A mass spectrometer system comprises: (a) an ion source; (b) a mass filter or a time-of-flight (TOF) ion separator configured to receive a stream of first-generation ions from the ion source; (c) an ion storage device having an ion inlet configured to receive a stream of filtered ions comprising a plurality of ion species from the mass filter or TOF separator and to accumulate the plurality of ion species therein; (d) an ion mobility cell having an ion inlet configured to receive an accumulated batch of ion species from the ion storage device and an ion outlet configured to release, one at a time, the individual ion species therefrom; and (e) a mass analyzer configured to receive and mass analyze each first-generation ion species or each fragment ion species generated by fragmentation or other reaction of the various first-generation ion species.

9 Claims, 8 Drawing Sheets

(56) References Cited

U.S. PATENT DOCUMENTS

| | | |
|---|---|---|
| 9,741,552 B2 | 8/2017 | Park et al. |
| 9,984,864 B2 | 5/2018 | Räther et al. |
| 10,408,792 B2 | 9/2019 | Betz et al. |
| 2004/0108455 A1 | 6/2004 | Mordehai |
| 2004/0200959 A1* | 10/2004 | Kovtoun ............. H01J 49/4265 250/288 |
| 2009/0194688 A1 | 8/2009 | Bateman et al. |
| 2010/0108879 A1 | 5/2010 | Bateman et al. |
| 2011/0042565 A1 | 2/2011 | Bateman et al. |
| 2016/0077054 A1 | 3/2016 | Giles et al. |
| 2016/0231275 A1 | 8/2016 | Park et al. |
| 2018/0151339 A1 | 5/2018 | Wildgoose et al. |
| 2019/0355568 A1* | 11/2019 | Papanastasiou ........ H01J 49/36 |

OTHER PUBLICATIONS

Hoaglund et al., "Three-Dimensional Ion Mobility/TOFMS Analysis ofElectrosprayed Biomolecules", Anal. Chem. 1998, 70, pp. 2236-2242.

Waters, "What Types of Instruments Are Used?—The analyzer: the heart of a mass spectrometer", https://www.waters.com/waters/en_US/What-Types-of-Instruments-Are-Used%3F/nav.htm?locale=%20en%20_IN&cid=10090937, (2021), 7 pages.

* cited by examiner

METHODS AND APPARATUS FOR HIGH SPEED MASS SPECTROMETRY

CROSS-REFERENCE TO RELATED APPLICATION

This application claims, under 35 U.S.C. § 119(e), priority to and the benefit of the filing date of and co-assigned U.S. provisional application for patent No. 63/029,866, which was filed on May 26, 2020 and which is titled "Methods and Apparatus for High Speed Mass Spectrometry", the disclosure of which is hereby incorporated by reference herein in its entirety.

TECHNICAL FIELD

The present disclosure relates to mass spectrometers and mass spectrometry.

BACKGROUND

Sensitivity, selectivity, and analytical throughput are the main figures of merit for mass spectrometers, and perhaps analytical instrumentation in general. Any advance in these areas is immediately exploited by the analytical community, often in compounded beneficial ways. For example, an improvement in sensitivity not only allows the analysis of lower concentration species, but in some cases can be used to eliminate time-consuming sample preparation steps. In the past few decades, mass spectrometers using atmospheric ionization have made great advances in sensitivity, as manufacturers have increased ion transmission by using larger atmospheric orifices in concert with specialized ion optics for transporting ions through high pressure regions. As this approach nears its limit of practical exploitation, researchers are looking for other ways to improve sensitivity and efficiency.

Some progress in improving mass spectrometer sensitivity and efficiency has been described in terms of an operating scheme known as Parallel Accumulation Serial Fragmentation (PASEF), which is taught in Meier, Florian, Scarlet Beck, Niklas Grassl, Markus Lubeck, Melvin A. Park, Oliver Raether, and Matthias Mann. "Parallel accumulation-serial fragmentation (PASEF): multiplying sequencing speed and sensitivity by synchronized scans in a trapped ion mobility device" Journal of proteome research 14, no. 12 (2015): 5378-5387 as well as in U.S. Pre-grant Patent Publ. No. 2017-0122906-A1. FIG. 1A is a highly schematic illustration of a PASEF-capable mass spectrometer system 30, as has been described in U.S. Pre-grant Patent Publ. No. 2017-0122906-A1. The mass spectrometer system 30 comprises an ion source 108 (illustrated in the drawing as an electrospray needle) and a holding cell 11 (i.e., an ion storage apparatus) that receives ions from the ion source. The holding cell 11 is interfaced to a trapped ion mobility separator (TIMS) apparatus 12 that is followed, in sequence along a general ion pathway, by a quadrupole mass filter (QMF) 13, a collision cell 14 and a time of flight (TOF) mass analyzer 15. Multiple ion species are trapped in the TIMS cell 12 and separated therein in accordance with their respective ion mobility values. The so-separated ion species are then sent one at a time from the TIMS cell 12 through the quadrupole 13, fragmented in the collision cell 14, and the resulting fragments are analyzed in the TOF mass analyzer 15. At the same time that the ion species are being processed in the TIMS cell, quadrupole, collision cell and mass analyzer, the holding cell 11 accumulates ions for the next iteration of the process. The operation of the various components of the PASEF-capable system 30 may be controlled by electronic controller or computer 31 that is interfaced to the various components by electronic couplings (shown as dashed-line arrows) and that may comprise computer-readable instructions operable to control the sequence and timing of various operations that are carried out by those components.

The PASEF strategy employs a mass spectrometer system that includes a trapped ion mobility spectrometry (TIMS) device of the types taught in U.S. Pat. No. 7,838,826 in the name of inventor Park and in U.S. Pat. No. 9,683,964 in the names of inventors Park et al. As described in those patents, a TIMS apparatus provides an operating method comprising the steps: (a) accumulating ions from an ion source in an RF ion trap, corresponding to holding cell 11; (b) transferring at least a subset of the accumulated ions into a trapping ion mobility separator that is downstream from the RF ion trap, in which the transferred ions are radially confined by an RF field and are pushed by a gas flow against a rising edge of a first axial electric DC field barrier such that the transferred ions are spatially separated along the rising edge according to ion mobility; and (c) acquiring an ion mobility spectrum of the transferred ions by decreasing the height of the electric DC field barrier while ions from the ion source are further accumulated in the RF ion trap. FIG. 1B is a schematic depiction of a mobility spectrometer apparatus as taught in U.S. Pat. No. 9,683,964. The apparatus comprises an elongated ion tunnel 111 through which ions pass. The boundary of the tunnel is defined by a plurality of parallel segmented diaphragms having electrodes thereon. The ion tunnel 111 is divided into an accumulation tunnel 111a and a mobility scan/separation tunnel 111b. The apparatus includes two voltage supply units (not shown) for the two tunnel units. The apparatus also comprises an entrance funnel 110 at an inlet end and an exit funnel 112 at an outlet end. A repeller plate 109 directs ions 106 from the ion source 108 into the entrance funnel 110. while most gas molecules 107 from the ion source continue on an undeflected pathway to a gas exhaust. Others versions of mobility spectrometer apparatuses as taught in U.S. Pat. No. 7,838,826 lack the accumulation tunnel section and, instead, utilize the entrance funnel portion for ion accumulation. The separation of ions according to their mobilities is based upon a gas flow in the cylindrical separation tunnel which drives the ions from an ion source in an accumulation phase against a counter-acting electric DC field barrier while the ions are radially confined by a quadrupolar RF field. Referring, once again, to FIG. 1A, if the TIMS device is as described in U.S. Pat. No. 9,683,964, then the illustrated holding cell 11 and TIMS device 12 may correspond to the accumulation 111a tunnel and scan/separation tunnel 111b, respectively, as shown in FIG. 1B. Otherwise, the holding cell 11 and TIMS device 12 may be separate apparatuses.

It is known that the PASEF technique is able to increase instrument sensitivity by a factor of approximately five. Nonetheless, the technique is limited by the capacity of the initial storage device and the speed of analyzing the precursors emanating from the TIMS cell. Any ion storage or ion separation device will have an effective maximum capacity to trap ions. Any increase in ion density beyond the maximum filling capacity will result in adverse space charge effects that cause loss of ions. The time required to fully scan the TIMS device (scan time) depends on the mobility range of the ion species being investigated as well as a desired ion mobility spectral resolution. According to U.S. Pat. No. 9,683,964, typical scan times can range from 60 milliseconds to 360 milliseconds. For example, assume that the storage capacity of the holding cell is $1\times10^7$ ions, and the flux of ions entering it is $1\times10^9$ ions per second. In this case, the holding cell will fill to capacity in a time period of duration, $t_g$, equal to 10 ms, and an entire iteration of TIMS and MS/MS analysis of multiple precursors (occurring during an analysis time period of duration $t_a$) will be required to finish within that filling time. If the QMF isolation, fragmentation, and TOF analysis of the fragments requires 2 ms per precursor released from the TIMS, this would yield a sensitivity gain of approximately 5. However, this method may have a limited dynamic range because there is no filtering of the ions that enter the first holding cell. If the flux of ions is greater than a threshold amount, the holding cell or cells may fill to capacity and ions will be lost, resulting in nonlinear response to analyte concentration. Alternatively, at high ion flux, fewer precursors per iteration will have time to be analyzed, and there could be no sensitivity gain. Accordingly, there is a need in the art for the development of systems and methods that control the total ion flux through a sequence of ion analysis and ion processing apparatuses such that each at least one such apparatus receives a flux of ions that is in accordance with its capacity to process those ions.

SUMMARY

Against the above background, the present disclosure describes improved systems and methods for utilization of ion beams that yield ion species analyses with increased sensitivity and high dynamic range.

According to a first aspect, the present teachings provide a mass spectrometer system, comprising: (a) an ion source; (b) a mass filter or a time-of-flight (TOF) ion separator configured to receive a stream of first-generation ions from the ion source; (c) an ion storage device having an ion inlet configured to receive a stream of filtered ions comprising a plurality of ion species from the mass filter or TOF separator and to accumulate the plurality of ion species therein; (d) an ion mobility cell having an ion inlet configured to receive an accumulated batch of ion species from the ion storage device and an ion outlet configured to release, one at a time, the individual ion species therefrom; and (e) a mass analyzer configured to receive and mass analyze each first-generation ion species or each fragment ion species generated by fragmentation or other reaction of the various first-generation ion species. The apparatus may further comprise: (f) a fragmentation cell configured to receive, one at a time, the individual ion species released from the trapped ion mobility cell and to generate a respective plurality of fragment-ion species therefrom. According to some embodiments, the mass filter or TOF separator may be configured to transmit a single packet of ions to the ion storage device, wherein the packet of ions comprises a single mass-to-charge ratio (m/z) range that is reduced relative to an m/z range generated by the ion source. According to some other embodiments, the mass filter or TOF separator may be configured to transmit a single packet of ions to the ion storage device, wherein the packet of ions comprises ion species that are distributed among multiple, non-contiguous, non-overlapping m/z ranges. According to some other embodiments, the mass filter or TOF separator may be configured to transmit a series of packets of ions to the ion storage device, wherein each packet of ions comprising a respective m/z range, the plurality of m/z ranges being non-contiguous and non-overlapping, and wherein the ion storage device is configured to co-accumulate the ions of the series of packets.

BRIEF DESCRIPTION OF THE DRAWINGS

The above noted and various other aspects of the present invention will become apparent from the following description which is given by way of example only and with reference to the accompanying drawings, not necessarily drawn to scale, in which.

DETAILED DESCRIPTION

Figure 1A:
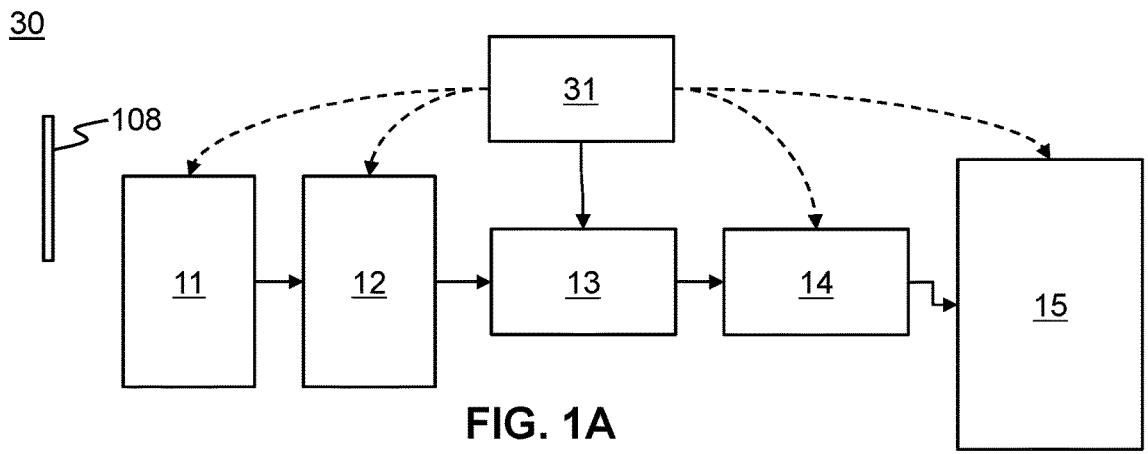
FIG. 1A is a schematic diagram of a known mass spectrometer system that includes a trapped ion mobility spectrometry (TIMS) device.
Figure 1B:
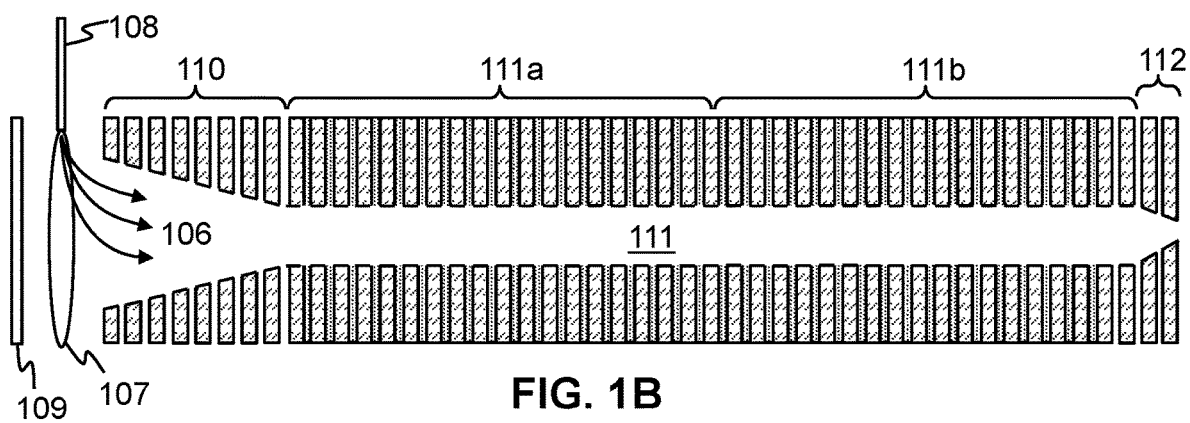
FIG. 1B is a schematic depiction of a known trapped ion mobility spectrometer apparatus.

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features of the present invention in greater detail, please refer to FIGS. 1A-1B and 2-10 in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. Moreover, it is to be appreciated that the figures, as shown herein, are not necessarily drawn to scale, wherein some of the elements may be drawn merely for clarity of the invention. In addition, reference numerals may be repeated among the various figures to show corresponding or analogous elements.

Unless otherwise defined, all other technical and scientific terms used herein have the meaning commonly understood by one of ordinary skill in the art to which this invention belongs. In case of conflict, the present specification, including definitions, will control. It will be appreciated that there is an implied "about" prior to the quantitative terms mentioned in the present description, such that slight and insubstantial deviations are within the scope of the present teachings. In this application, the use of the singular includes the plural unless specifically stated otherwise. In addition, the use of "comprise", "comprises", "comprising", "contain", "contains", "containing", "include", "includes", and "including" are not intended to be limiting. As used herein, "a" or "an" also may refer to "at least one" or "one or more." Also, the use of "or" is inclusive, such that the phrase "A or B" is true when "A" is true, "B" is true, or both "A" and "B" are true.

Generally, it is desirable to utilize any given ion analysis hardware configuration comprising multiple ion analysis apparatuses as well as one or more ion processing apparatuses in an efficient fashion that yields both high sensitivity high dynamic range. As used in this document, the term "multiple ion analysis apparatuses" includes a mass analyzer as well as at least one ion mobility separator (IMS) apparatus, which, in some instances, may comprise a trapped ion mobility separator (TIMS) apparatus. As used in this document, the term "ion processing apparatuses" includes, without limitation, ion storage, ion fragmentation, ion filtering and ion reaction apparatuses. Ions are provided by an ion source that generates the ions from unionized samples and that is generally considered to be component of any mass spectrometer system. The apparatuses and methods of the present teachings may employ any suitable ion source the generates a continuous or quasi-continuous stream of ions. In this document, the term "first-generation ions" refers to ions of ion species generated by an ion source, possibly as modified by in-source fragmentation but otherwise unmodified by any controlled ion fragmentation or ion reaction processes. The terms "product ions" and "fragment ions", as used in this document refer to ions generated from first generation ions by controlled ion fragmentation or other ion reaction processes. If such product ions or fragment ions are generated, then the first-generation ions from which they are generated may be referred to, in this document, as "precursor ions".

A basic guiding principle of the present teachings is that the flux of precursor ions entering a holding or storage cell for the purpose of simultaneously accumulating a plurality ion species should be matched to the sum of the serial speed of processing or analyzing the plurality of multiple ion species. As an example, consider a plurality of m precursor-ion species. Specifically, if ions of m first-generation ion species, each with flux, $f_i$ (number of ions of species, i, per unit time) are accumulated in parallel in a holding cell for a gating time, $t_g$, then there will be a total number of N ions accumulated. In this case, the gate time and/or flux of the ions should be controlled so that N is less than or equal to the capacity C of the holding cell or other ion storage apparatus. This condition is set forth in Eq. 1 as:

$$N \le C : N = t_g \sum_{i=1}^{m} f_i. \qquad \text{Eq. 1}$$

where the index, i, identifies the various ion species. A second condition is that the sum, $t_A$, of the subsequent individual serial analysis and processing times, $t_j$, of the n (where n≤m) first-generation ion species of interest and their product ions (if any) should not be longer than the time, $t_g$, to fill the holding cell as set forth in Eq. 2 below.

$$t_A \le t_g : t_A = \sum_{j=1}^{n} t_j \qquad \text{Eq. 2}$$

For example, each individual processing time, $t_j$, may correspond to the time required to fragment the $j^{th}$ precursor-ion species as well as to mass analyze one or more of the various product ion species generated by fragmentation or other reaction of ions of that precursor-ion species. Generally, it is the case that, for each $j^{th}$ precursor-ion species, $t_j \ll t_g$.

In the special case, when both N=C and $t_A = t_g$, then the optimization of sensitivity and efficiency are balanced. Although this ideal situation may not be generally achievable in practice, an approximation to the ideal situation may be accomplished by performing one or more of the following adjustments: (a) increasing the capacity, C, of the holding cell; (b) increasing the speed of mass analysis; (c) reducing total ion flux, f, by reducing the "brightness" of the ion source; and (d) reducing total ion flux, f, by reducing the number, n, of first generation that are analyzed together in a single batch. Generally, for any particular mass spectrometer system, options (a) and (c) are not practical solutions. If conventional mass spectrometer configurations are employed, then option (b) may only be practical if more than one mass analyzer is available or if sensitivity may be sacrificed. Therefore, in the following discussion, the inventors primarily consider practical means of reducing non-essential ions in the holding cell so that the total number of accumulated ions, N, is reduced, thereby allowing for a longer gating time, $t_g$, that results in higher-sensitivity analyses. The inventors also consider a non-conventional means to achieve the benefits of option (b) by employing a technique of parallel ion processing pipelines.

Figure 5:
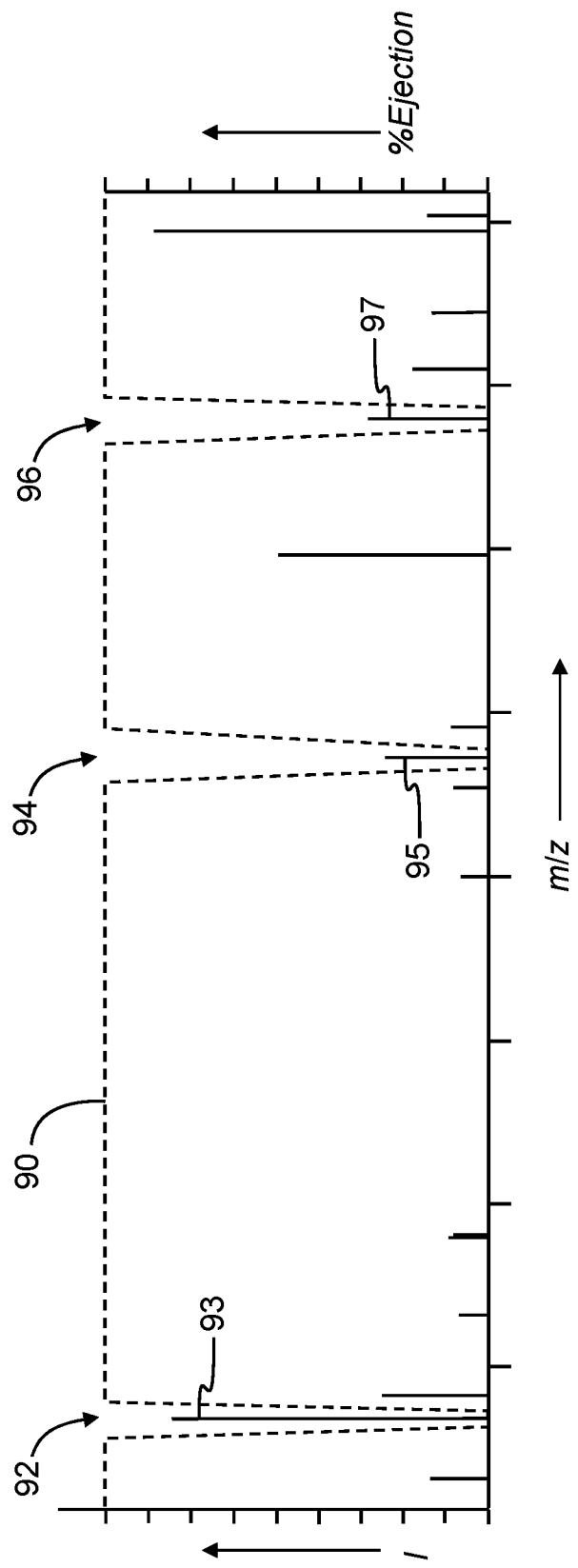
FIG. 5 is a schematic diagram of a hypothetical mass spectrum of co-isolated ion species that are accumulated together by multi-notch ion isolation.

In accordance with the present teachings, several efficiency-enhancing improvements to the operation of the mass spectrometer system 30 of FIG. 1A are possible. Firstly, the total ion flux may be reduced, for example, by providing means for simultaneous multiple precursor ion isolation using broadband multi-notch isolation waveforms, as described in U.S. Pat. No. 9,048,074, the disclosure of which is hereby incorporated by reference in its entirety. This type of isolation may be implemented by either a multipole ion trap apparatus or a multipole mass filter apparatus. For example, FIG. 5 is a schematic diagram of a hypothetical mass spectrum of co-isolated ion species plotted together with an overlaid plot of percentage of ions ejected from the trap as a function of mass-to-charge ratio when multi-notch ion isolation is applied. The hypothetical mass spectrum is shown as vertical solid lines along the mass-to-charge (m/z) shown as increasing from left to right and corresponding to an intensity scale at the left of the plot. The dashed line 90 indicates the percentage of ions ejected as a function of mass-to-charge ratio and corresponds to the percentage-of-ions-ejected (% Ejection) scale at the right of the plot. Selective filtering of an ion stream by a time-of-flight (TOF) ion separator may achieve a similar result, as is described later in this document.

As is known, the multi-notch isolation is performed by the application, to electrodes of a quadrupole ion trap, of a supplementary broadband AC voltage waveform from which certain selected frequencies are missing, thus creating the notches. Under the application of the waveform, ions of all mass-to-charge ratios are ejected from the trap with the exception of certain mass-to-charge windows that correspond to the notches. Ions whose m/z values are within any of the windows of interest will not be ejected from the ion trap and thus such ions will be co-isolated within the ion trap. The hypothetical plot of FIG. 5 illustrates three such notches, denoted as notch 92, notch 94 and notch 96. The notches are chosen so as to isolate particular ions of interest within the trap, upon ejection of ions whose m/z ratios are not within any of the notches. In the hypothetical plot of FIG. 5, the notches 92, 94 and 96 respectively correspond to ion peaks 93, 95 and 97 of the hypothetical co-isolated ion species, each of which has an m/z value that is within a respective m/z transmission range of the mass filter. The widths of the transmission ranges (i.e., isolation windows) correspond to the widths of the notches 92, 94 and 96. In practice of the present teachings, the notches and associated transmission regions need not be as narrow as is suggested by FIG. 5. Instead, the transmission regions may be broad so that the reduce overall ion flux that is transmitted by the mass filter while eliminating broad ranges of m/z values that are not of analytical interest. However, the notches and associated transmission regions are generally non-overlapping and non-contiguous.

Figure 2:
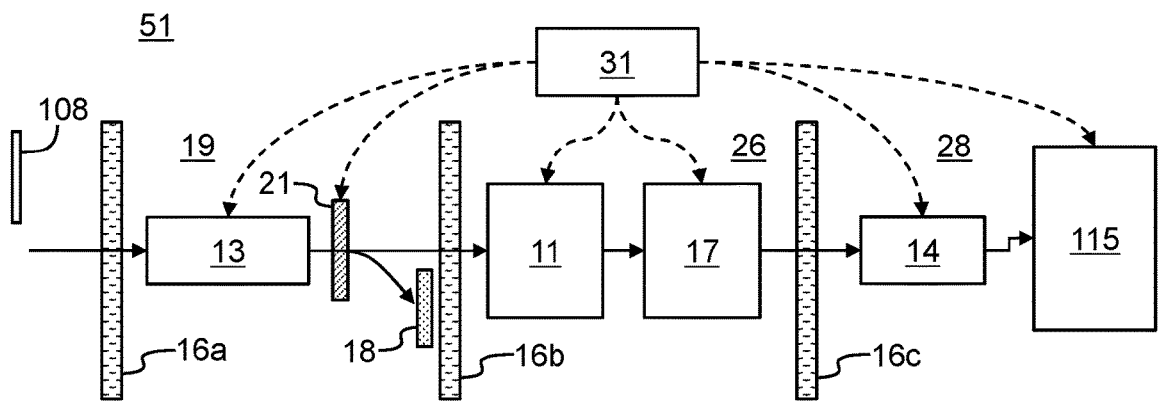
FIG. 2 is a schematic depiction of a mass spectrometer configuration in accordance with the present teachings having improved beam utilization and sensitivity.

An embodiment of a mass spectrometer system in accordance with the present teachings that is adapted to meet the requirements of Eqs. 1 and 2 is schematically depicted in FIG. 2. This mass spectrometer configuration scheme of the mass spectrometer system 51 (FIG. 3) is essentially a rearrangement of the components depicted in FIG. 1A, with some additional differences. In particular, the mass filter 13 of the mass spectrometer system 51 is moved upstream from the holding cell 11. Generally, the mass filter 13 will operate at lower pressure than that of the holding cell 11. In such instances, the mass filter 13 may be disposed in a separate compartment 19 from compartments containing the ion source 108 and the holding cell 11. The compartment 19 may be separated from the ion source 108 and from an adjacent compartment 26 by compartment walls, 16a and 16b, respectively. Further, the compartment 26 may be separated from an adjacent high-vacuum compartment 28 by a compartment wall 16c, with the various compartments maintained at different pressures by differential vacuum pumping. The ion source may comprise any continuous or quasi-continuous ion source, such as an electrospray ion source, an atmospheric pressure chemical ionization (APCI) source, a matrix-assisted laser desorption/ionization (MALDI) source or otherwise. Further, mass analyzer 115 may comprise any known type of mass analyzer such as, but not limited to, a time-of-flight mass analyzer, a quadrupole mass analyzer or an ORBITRAP™ electrostatic trap mass analyzer.

According to one mode of operation of the mass spectrometer system 51, the mass filter 13 may simultaneously isolate and transfer all precursor ions that are to be serially analyzed, but with very coarse isolation that eliminates the m/z values of ion species that are not of interest—for example, a single wide isolation window that encompasses the m/z values of all anticipated precursor-ion species within a particular m/z range. As a different example, the mass filter 13 may be operated to perform coarse simultaneous multi-notch isolation of ion species of interest. In such fashions, ion species that are not of interest are eliminated while ion species that are of interest are transmitted through the mass filter. The ion filtering operation reduces the total number of ions N that are accumulated in the holding cell 11 during controlled time periods of duration $t_g$, thereby allowing Eq. 1 to be satisfied. The filtered stream of ions is transmitted from the mass filter 13 to the holding cell 11 under the operation of an additional gating element 21 that is interposed between the mass filter 13 and the holding cell 11.

Prior to formal analysis of ion species, a pre-scan may be carried out to determine the flux of first-generation ions emanating from the ion source 108. In general, the information obtained from the pre-scan will be used to determine how many ions must be eliminated from the ion stream in order to fill the holding cell 11 to close to its holding capacity, C, while not exceeding that capacity within the allotted time, $t_g$. The pre-scan may be performed as a mass analysis executed by the mass analyzer 15 upon sending the filtered stream of ions through the holding cell 11, ion mobility cell 17 and collision cell 14 (without fragmentation) for a test time period of duration $t_{test}$. By using this type of pre-scan, it is possible to determine the locations, in m/z, of the notches to be employed in a multi-notch isolation procedure. Alternatively, the pre-scan may be performed by causing the gating element 21 to divert the ion stream to an auxiliary ion current detector 18. A Bradbury-Nielsen gate is suitable for such operation.

As in the known system configuration (FIG. 1A), the ions are passed, in the system 51, from holding cell 11 to an ion mobility separator (IMS) apparatus 17 which, in certain embodiments, may be a trapped ion mobility separator (TIMS) device. The IMS apparatus 17 outlets ions of each ion species, approximately one species at a time, which are then transmitted to an optional fragmentation cell 14. If a fragmentation cell or reaction cell 14 is present, first-generation precursor ions may be therein fragmented or reacted with reagent ions so as to generate a respective set of product-ion species from each precursor-ion species delivered into the fragmentation cell. Ion species that exit the ion mobility separator or the fragmentation cell are transmitted to the mass analyzer 115. As specified by Eq. 2, the total duration of time required for ion mobility separation, optional fragmentation, and analysis of all n precursor ions and product ions should be less than the total accumulation time, $t_g$, in holding cell 11. The steps included in the operation of the system 51 may be controlled by electronic controller or computer 31 that is interfaced to the various components by electronic couplings (shown as dashed-line arrows) and that may comprise computer-readable instructions operable to control the sequence and timing of various operations that are carried out by those components.

Figure 3:
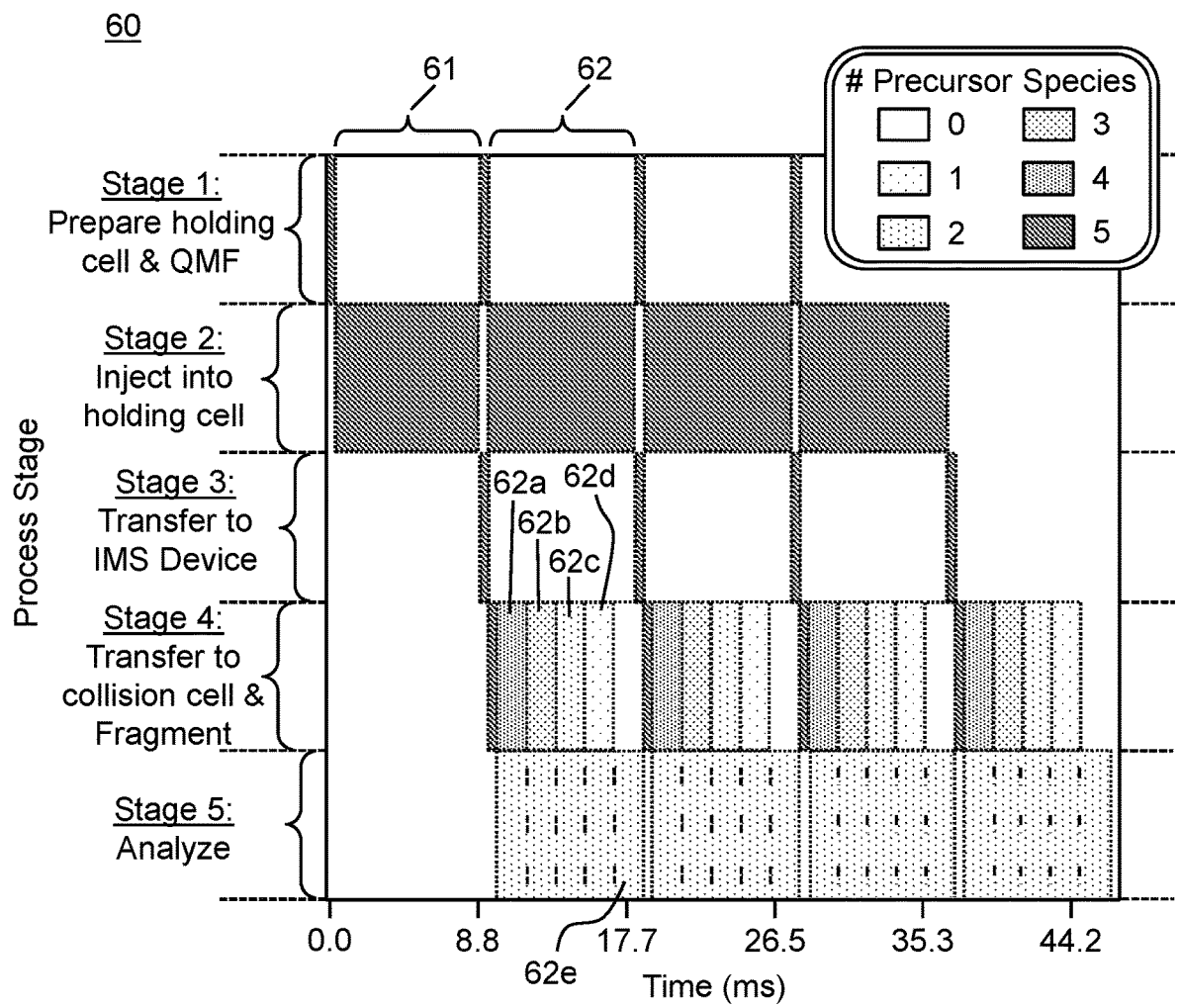
FIG. 3 is a schematic depiction of operation, in accordance with the present teachings, of a mass spectrometer that is configured according to FIG. 2 in accordance with a five-stage processing pipeline.

An analysis of the operation of the system 51 of FIG. 2 was carried out to model the expected gain in sensitivity that could be achieved, given multiple precursor selection in the mass filter 13, certain likely values for the gating times, $t_g$, and analysis times, $t_A$, and the transfer times of ions between devices. For example, FIG. 3 shows how a five-stage pipeline of serial analysis with parallel accumulation may be set up. The so-called "pipeline" concept of mass spectral analysis is described in greater detail in co-pending U.S. patent application Ser. No. 16/678,879, titled "Methods and Apparatus for High Speed Mass Spectrometry" that was filed on Nov. 8, 2019 and that is assigned to the assignee of this application, the disclosure of said co-pending application being incorporated herein by reference in its entirety. A main aspect of the pipeline concept is that different batches of analyte-derived ion species may simultaneously occupy different mass spectrometer pathway segments, each segment corresponding to a different respective step of an overall analysis process. Accordingly, different process steps may be executed simultaneously, where each process step may be specifically configured to operate in accordance with the particular analyte-derived ion species that occupy the pathway segment at which that step is executed. A so-called pipeline "stage" is either a single process step or a set of one or more consecutive process steps that are applied to an individual batch of analyte-ion species.

The plot of FIG. 3 relates to tandem mass spectral analysis, often referred to as MS/MS analysis. The pipeline analysis scheme depicted in FIG. 3 was constructed assuming that 0.5 ms are required to prepare the mass filter 13 and the holding cell 11 for use, 0.5 ms are required to transfer the ions in the holding cell 11 to the IMS apparatus 17, 0.5 ms are required to transfer ions from the IMS apparatus 17 to the fragmentation cell 14, and 2 ms are required to analyze a precursor ion and its fragments in the mass analyzer 15. This plot shows how at least 5 precursor ion species may be injected into and accumulated within the holding cell 11 for approximately 8.8 ms (e.g., at Stage 2, during time period 61) and transferred (Stage 3) to the IMS apparatus 17, and how immediately afterwards (e.g., at Stage 2, during time period 62), a new set of precursor ion species may be injected into the holding cell 11. At the same time that the second group of five precursor ion species are being injected into the holding cell 11, all of the following operations occur: (a) the first group of precursor-ion species are sequentially ejected from the IMS apparatus 17 to the fragmentation cell 14 (e.g., at Stage 4, during time periods 62a-62e); (b) each precursor-ion species is fragmented, in turn, in the fragmentation cell 14 (e.g., at Stage 4, during time periods 62a-62e); and (c) a mass spectral scan is made of each precursor species and its respective fragment species, in turn, by the mass analyzer 15 (e.g., at Stage 5, during time periods 62a-62e). The various shadings of the boxes representing the Stage 4 time periods 62a-62e indicate how many ion species remain in the IMS apparatus 17 at the end of each respective time period. During each of these same time periods, ions of only a single respective species are present within the fragmentation cell. Each cycle requires about 10 ms.

Figure 4:
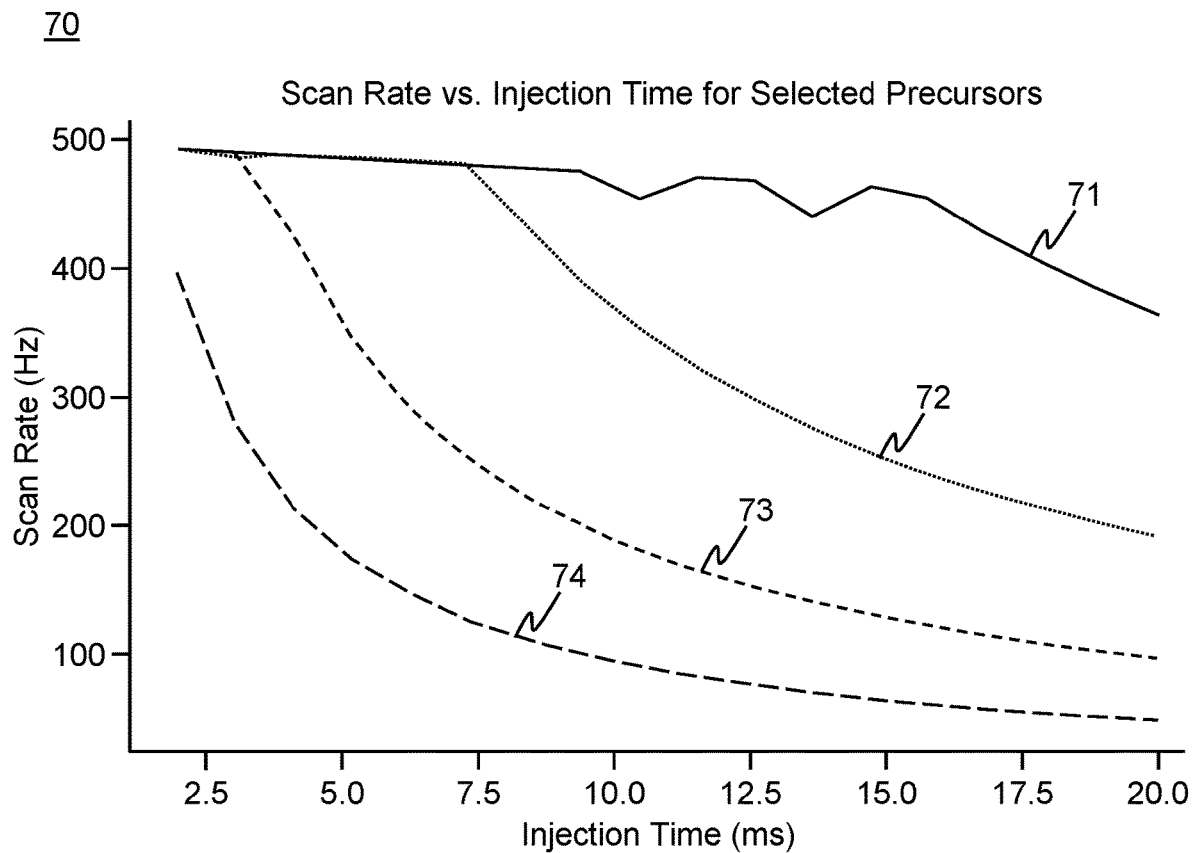
FIG. 4 is a graph of precursor-ion analysis rates versus injection time for various numbers of precursor species per cycle of the five-stage processing pipeline of FIG. 3.

When operated as described above, the mass spectrometer instrument 51 depicted in FIG. 2 is capable of extremely fast effective precursor species analysis rates, with good sensitivity for each precursor species as a result of the relatively long injection times, $t_g$, that are possible. For example, FIG. 4 is a graph 70 that quantifies the expected precursor analysis rate of this instrument for various injection times and numbers of precursors serially analyzed. Traces 71, 72, 73 of graph 70 correspond to simultaneous accumulation and subsequent MS/MS analysis of eight, four and two precursor ion species, respectively. Curve 74 corresponds to analysis of only one precursor ion species at a time. For example, trace 74 shows how an instrument capable of 2 ms analysis times could achieve nearly 350 Hz MS/MS rates; however, such analyses would be limited to 2.5 ms injection times, which is generally too small to be analytically useful. In contrast, when eight precursors are simultaneously accumulated and analyzed, 400 Hz precursor analysis rates could be achieved with 17.5 ms of injection time for all precursors, which is long enough for analysis of low concentration analytes.

Many details would need to be considered in order to maximize the potential of a mass spectrometer system that operates as described above. Perhaps chief among them would be the consideration of the different fluxes of precursors that are accumulated in parallel. The gate time, $t_g$, would, in general, need to be regulated such that the number of ions accumulated in the holding cell 11 does not exceed its storage capacity, and such that the number of ions of each type is not so high that the spectral space charge capacity of the mass analyzer 15 is exceeded. For example, if one of the precursors has a very high flux compared to the others, then $t_g$ might need to be set to a value smaller than required for high quality analysis of the lower-flux precursors. One way to solve this problem would be to choose precursors with similar flux. In a typical experiment, this instrument would be used to analyze hundreds of precursors per second. The acquisition list of precursors to be analyzed could be sorted by anticipated or known intensity, and precursors analyzed in groups such that the intensities of the precursors in each group were within a factor of the other precursors in the group. This and several other considerations are taught in U.S. Pre-Grant Publ. No. 20170345631A1 which is commonly assigned with this application.

U.S. Pre-Grant Publ. No. 20160020083A1, which is hereby incorporated by reference herein in its entirety, discloses another way of ensuring that the precursors in a multiplexed group have similar intensities by using a multi-notch isolation waveform (see FIG. 5) composed of several stages, such that initially the waveform produced n isolation windows, then n−1 isolation windows, etc. According to that method, the mass filter 13 may be operated such that each precursor ion species or each set of precursor ion species is accumulated in the holding cell 11 for an individually addressable time period. Thus, the most intense precursor is only accumulated for a shorter time, and the lower flux precursors are accumulated for longer times.

Figure 6:
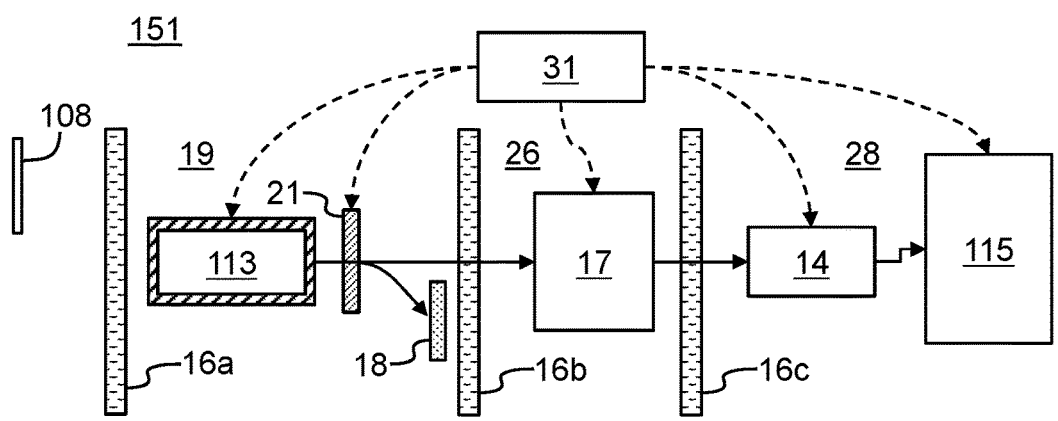
FIG. 6 is a schematic depiction of a second mass spectrometer configuration in accordance with the present teachings.

FIG. 6 is a schematic depiction of a second mass spectrometer configuration 151 in accordance with the present teachings. In the system 151, an ion trap 113, such as a linear quadrupole ion trap, replaces both the mass filter 13 and the holding cell 11 of the mass spectrometer system 51 (FIG. 2). The ion trap 113 receives and temporarily stores first-generation ions from the ion source 108 and is capable of delivering all or some of the first-generation ions to an ion mobility separator (IMS) apparatus 17 which, according to some embodiments, may be a trapped ion mobility separator (TIMS) device. Prior to performing formal analyses of the first-generation ions or of product ions generated from the first-generation ions, a pre-scan may be performed, as described above, in order to determine either the flux of first-generation ions emanating from the ion source and/or the m/z values of those ions. The pre-scan may be performed as a mass analysis executed by the mass analyzer 15 and/or as a measurement of ion current as obtained by the auxiliary ion current detector 18.

The transfer of ions from the ion trap 113 to the IMS apparatus 17 may be performed according to a variety of methods. According to one method of ion transfer, a quantity of first-generation ions that is equivalent to or just less than the capacity of the IMS device is accumulated in the ion trap. The accumulation terminates when an entrance gate (not shown) of the ion trap is closed. No ion isolation or selection is performed and, thus, the accumulated ions comprise ion species having a range of m/z values. Subsequently, the gating element 21 is operated to release the accumulated ions from the ion trap and into the IMS device as a single packet of ions. According to a second method of ion transfer, a quantity of first-generation ions that is greater than the capacity of the IMS device is accumulated in the ion trap 113. Generally, the ions comprise a plurality of ion species. A certain subset of the ion species are then either isolated or co-isolated in the ion trap by resonant ejection of ion species having m/z values that are not of analytical interest. Isolated ions comprise ion species having m/z values that are all within a single range. Co-isolated ions comprise ions species having m/z values that are distributed among a plurality of non-overlapping m/z ranges. After the resonant ejection of some ion species, the quantity of ions within the ion trap is equal to or just less than the capacity of the IMS device. The isolated or co-isolated ions are then transferred to the IMS device as a single packet of ions. According to a third method of ion transfer, a series of fills of the ion trap 113 are executed prior to the transfer of some of the ions to the IMS apparatus 17. After each fill of the ion trap, some ions having m/z values that are not of analytical interest are resonantly ejected from the ion trap while ions having other m/z values are retained. After one or more repetitions of the fill and ejection steps, the ions remaining in the ion trap include a high proportion of ion species having m/z values that are of analytical interest. These m/z values of interest may correspond either to a single isolated m/z range or to multiple, non-overlapping (co-isolated) m/z ranges. Each fill after the first fill augments the total quantity of isolated or co-isolated ions. The repeated filling of the ion trap continues until the quantity of isolated or co-isolated ions approximates but does not exceed the capacity of the IMS apparatus 17. At such time, the isolated or co-isolated ions are then transferred to the IMS device as a single packet of ions.

Figure 7:
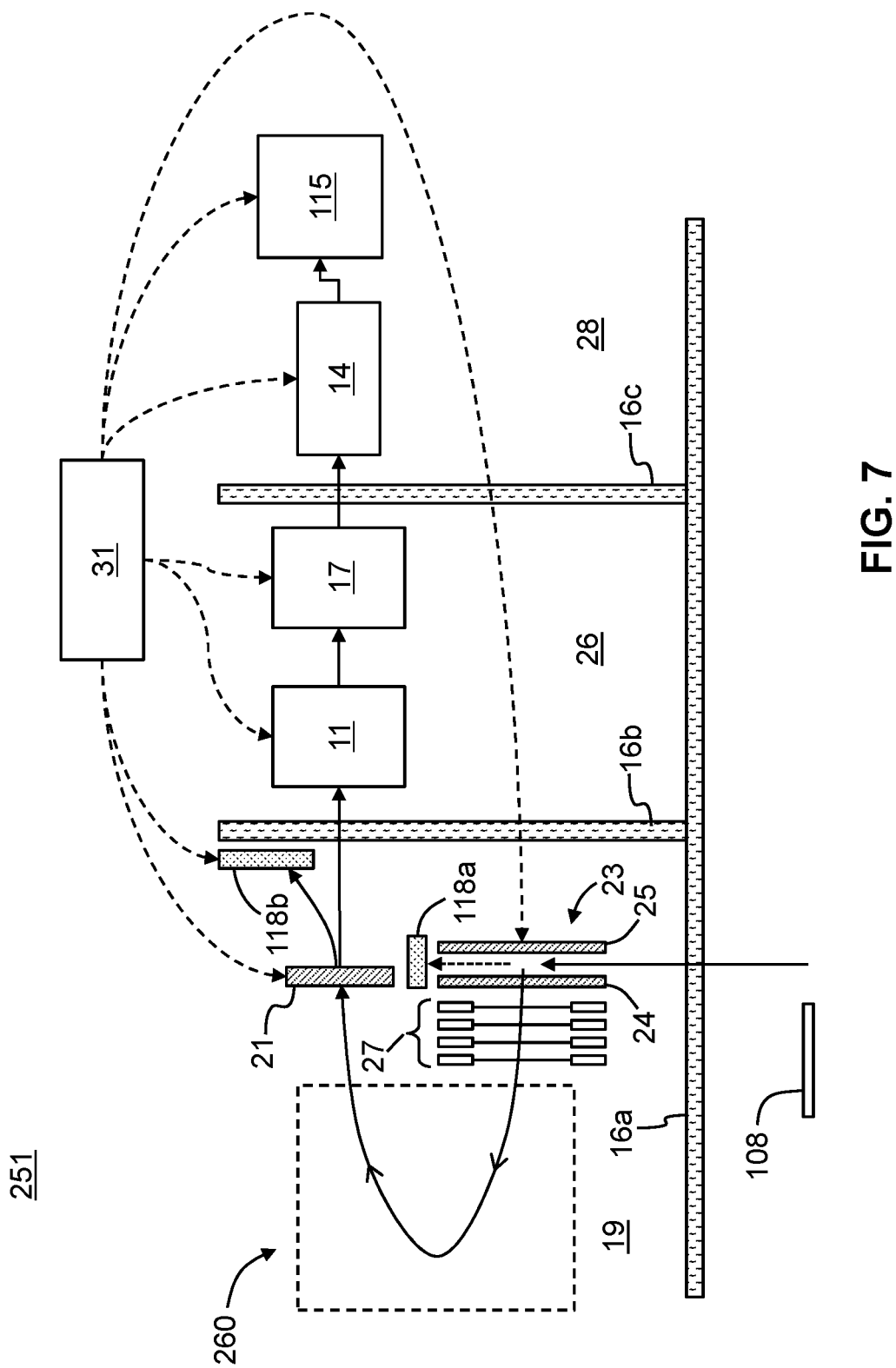
FIG. 7 is a schematic depiction of a third mass spectrometer configuration in accordance with the present teachings.

FIG. 7 is a schematic depiction of a third mass spectrometer configuration 251 in accordance with the present teachings. Compared to the system 151 of FIG. 6, the ion trap 113 is replaced by a non-trapping orthogonal accelerator 23 that is operated at higher repetition rates (preferably, 20-100 kHz) to provide a high duty cycle and hence high transmission. In the system 251 of FIG. 7, the orthogonal accelerator 23 is implemented as a pair of parallel plates 24, 25. The plate 24 acts as an extraction plate having a grid or, most preferably, a slit for extraction of a beam. The parallel plate 25 acts as a repeller plate. Ions enter the accelerator 23 when no DC voltage is applied across it. Any ions that enter the accelerator when no DC voltage is applied across it will impinge upon electrode 118a at which they will be neutralized. The electrode 118a may be an electrode of a current measuring device, such as an electrometer. Otherwise, at times when a pulsed voltage is applied across the parallel plates of the accelerator, ions are extracted via lenses 27 into a TOF analyzer 260. Depending upon the quality of isolation required, the TOF analyzer 260 may be a multi-reflection TOF, a multi deflection TOF or a single reflection TOF. A single reflection TOF is shown. Further details and configurations of suitable TOF analyzers are described in U.S. Pat. No. 9,683,964 which is hereby incorporated by reference herein in its entirety. On the return path from the TOF 260, ions are gated by an ion gate 21, with ions of interest being allowed to enter the IMS apparatus 17 and undesired ions being deflected to an ion stop 118b which may be a grounded electrode or an electrode of a current measuring device.

In accordance with the present teachings, the pulsing of the accelerator 23 and the opening and closing of the ion gate 21 are coordinated with one another in order to control which ions are allowed to enter the holding cell 11, since the time delay between the application of a voltage across the accelerator plates and the arrival time of ions at the ion gate 21 is dependent on the ions' m/z. During operation of the system 251, such coordinated operation may be employed to selectively admit only ions having certain m/z values of interest into the holding cell 11. The admitted ions may have m/z values within a single m/z range or, alternatively, distributed among a plurality of non-overlapping m/z ranges. Generally, each opening of the ion gate 21 admits a single packet of ions into the holding cell. Generally, multiple pulses, each corresponding to one or more ion packets, will be required to fill the holding cell 11 with ions up to or just less than its holding capacity, C. The number of required pulses will depend upon the total ion flux in an ion stream provided by an ion source as well as the relative quantities of ions of the various species in the ion stream. In any event, it is desirable that sufficient ion packets are admitted into the holding cell such that the final quantity of ions within the holding cell approaches, and is preferably equal to, its capacity, C, without exceeding the holding cell capacity. In the operation of the system 251, the variable time duration, $t_g$, is the time required to execute all the accelerator pulses necessary to admit the appropriate number of ion packets into the holding cell 11. As in other mass spectrometer configurations described herein, once the filling of the holding cell is completed, ions are then transferred from the holding cell into an ion mobility separator apparatus 17. Ion-mobility-separated ion species or product ions derived therefrom are transferred to and through other downstream mass spectrometer components that include at least a mass analyzer 115.

Figure 8:
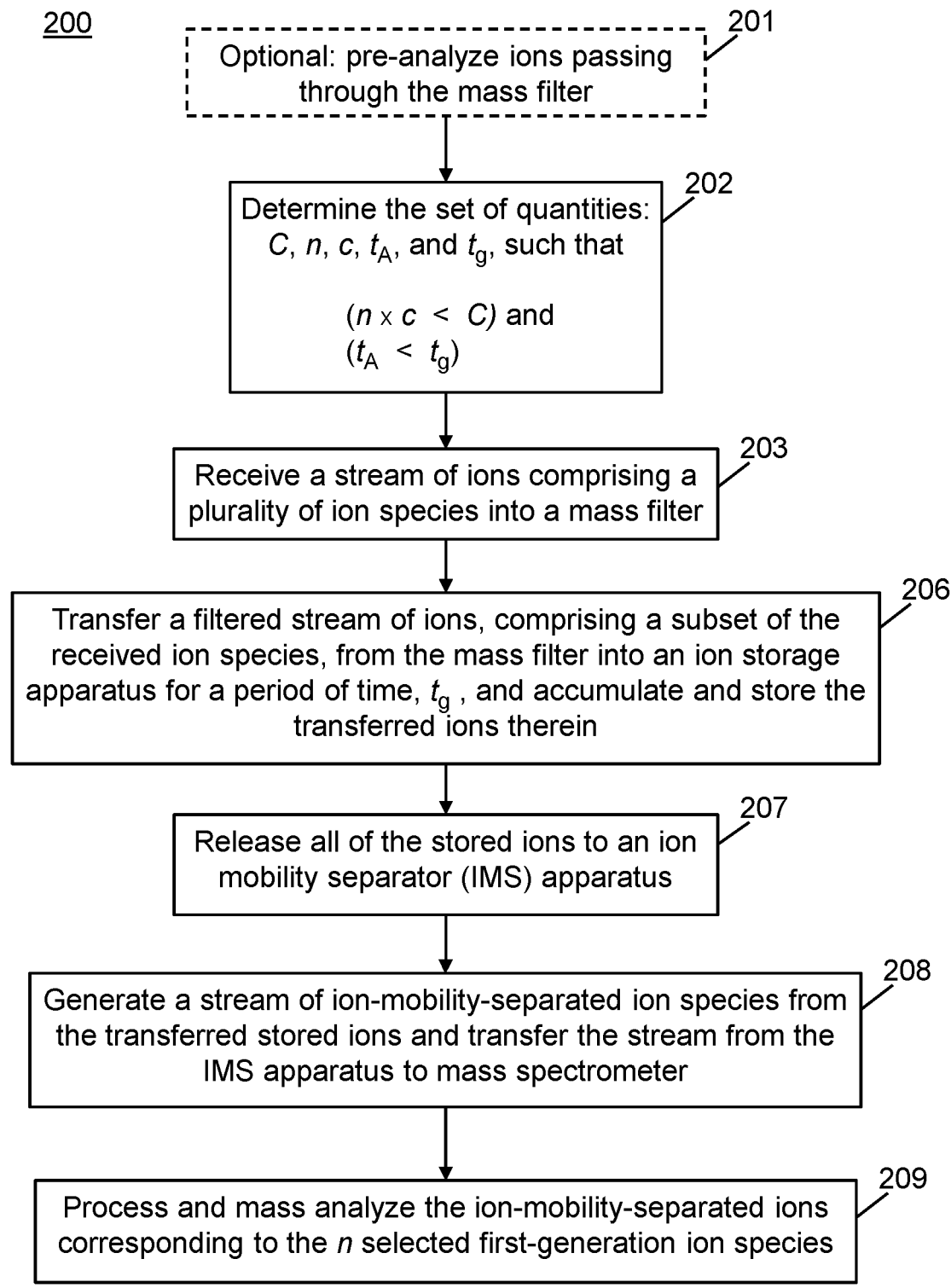
FIG. 8 is a flow diagram of a first method of ion mobility analysis and mass analysis of ions in accordance with the present teachings.

FIG. 8 is a flow diagram of a first method 200 of ion mobility analysis and mass analysis of ions in accordance with the present teachings. The method pertains to an analytical system that includes a mass filter, an ion mobility separator apparatus, an ion storage device interposed between the mass filter and the ion mobility separator apparatus and a mass analyzer configured to receive either ions that are outlet from the ion mobility separator apparatus or ions that are generated by fragmentation or reaction of the ions that are outlet from the ion mobility separator apparatus. The ion source may comprise any continuous or quasi-continuous ion source, such as an electrospray ion source, an atmospheric pressure chemical ionization (APCI) source, a matrix-assisted laser desorption/ionization (MALDI) source or otherwise.

In an optional first step 201 of the method, a pre-analysis may be performed in order to analyze characteristics of the first-generation ions that are inlet to or that pass through the mass filter, such as the mass-to-charge (m/z) ratios of the ions, the total ion flux, f, of ions and/or the flux of ions at each m/z. The next step 202 is the determination or calculation of the following five quantities: (i) a holding cell capacity, C; (ii) a number, n, of first-generation ion species that are to be co-analyzed; (iii) a minimum quantity, c, of ions of each species necessary for each ion-species analysis; (iv) a time $t_A$ required for all n analyses, including all mass analyses as well as ion mobility separation analysis; and (v) a time, $t_g$, based, on the known or determined ion flux, that is necessary to receive all requisite quantities of the n species from the ion source, wherein the quantities are such that both of the following inequalities are satisfied: (I) $(n \times c < C)$ and (II) $(t_A < t_g)$. Prior execution of the step 201 may be necessary in order to determine some of these quantities. The number, n, will preferably be chosen as large as possible consistent with the satisfaction of the two inequalities and also consistent with technically achievable isolation windows, as noted further below. The m/z values of the n first-generation ions that are to be analyzed are also chosen in this step. The holding cell capacity, C, will generally be a fixed quantity that may be known from a prior system calibration procedure. The quantity c will also generally be a fixed quantity that depends on characteristics of the mass spectrometer being employed. The time to may depend on the number, n, and may also depend on characteristics of the mass spectrometer system.

Step 203 of the method 200 is receipt of a stream of total flux, f, of first-generation ions into the mass filter of the analytical system (e.g., see FIG. 2). In the next step 206, a filtered stream of first-generation ions, comprising a subset of the received ions, is transferred from the mass filter into an ion storage apparatus for a period of time duration, $t_g$, and the transferred ions are accumulated and temporarily stored in the ion storage apparatus. During this step, the mass filter is configured to eliminate, from the ion stream, as many of the non-interesting ion species as is necessary to ensure that the total number of ions transferred into the ion storage apparatus during the time, $t_g$, does not exceed the capacity, C, of the ion storage apparatus (see Eq. 1). The filtered ion stream that passes out of the mass filter includes all of the ions of interest and may include other ions, provided that the total quantity of ions delivered into the storage apparatus during the allotted time period does not exceed the storage capacity, C. The m/z values of the ion species of the filtered ion stream may all occur within a single isolation window or, alternatively, may be distributed among two or more isolation windows having respective m/z ranges that are non-overlapping and non-contiguous. It should be kept in mind that some patterns of multiple isolation windows may be technically difficult or unfeasible. In such instances, it may not be possible to eliminate the full range of non-interesting ion species necessary to ensure that the total number of ions transferred into the ion storage apparatus is at or below its capacity. This factor should be kept in mind when choosing the number, n, and the m/z values of the first-generation ion species that are to be co-analyzed.

In step 207 of the method 200, all of the stored ions are released from the ion storage apparatus to an ion mobility separator (IMS) apparatus. The IMS apparatus may comprise a standard ion mobility apparatus or, alternatively, may comprise a trapped ion mobility separator (TIMS) apparatus, in which the separation of ions is based upon a gas flow in a separation tunnel which drives the ions against a counteracting electric DC field barrier at the same time that the ions are radially confined by a quadrupolar RF field. The ion storage apparatus and ion mobility apparatus may be formed as different portions of a single integrated apparatus such as the accumulation tunnel portion 111a and the mobility scan/separation tunnel 111b depicted ion FIG. 1B. Alternatively, the ion storage apparatus and ion mobility apparatuses may be separate apparatuses. Finally, in step 209, the ion-mobility-separated ions corresponding to the n selected first-generation ion species. The processing may include various processes such as fragmentation or other reaction of first-generation ions so as to generate product ions, selection of and further fragmentation of product ions, temporary storage of ions, etc.

Beginning at the time of the release of the ions into the IMS apparatus, the ions begin migrating through the IMS apparatus at different migration rates, based on their respective ion mobility constants, thereby generating a stream of ion-mobility-separated ion species (step 208). As each ion species exits the IMS apparatus, it is transferred downstream to various mass spectrometer components, possibly including components such as the collision cell 14 and mass analyzer 115 that are schematically depicted in FIG. 2. The total time duration required to fully analyze the ions begins at the time that ions are released into the IMS apparatus and ends at the time that the last of the first-generation ions (or the last of the product ions generated from the first-generation ions by fragmentation or other reaction) are mass analyzed.

Figure 9:
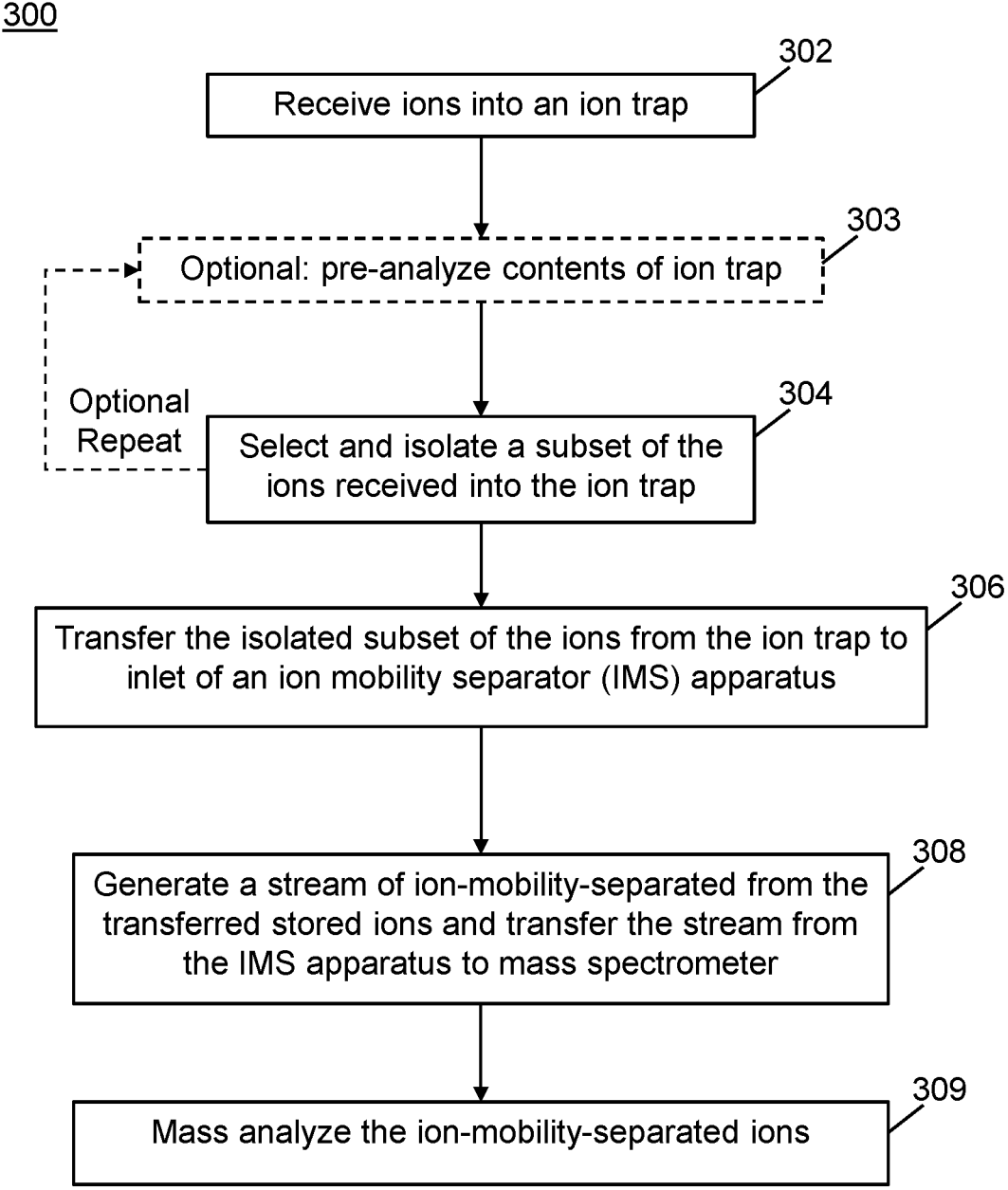
FIG. 9 is a flow diagram of a second method of ion mobility analysis and mass analysis of ions in accordance with the present teachings.

FIG. 9 is a flow diagram of a second method 300 of ion mobility analysis and mass analysis of ions in accordance with the present teachings. The first step 302 of the method 300 is receipt of first-generation ions into an ion trap of an analytical system (e.g., see FIG. 6) that further comprises: an ion mobility separator apparatus (which may be a trapped ion mobility separator apparatus) and a mass analyzer that is configured to receive either first-generation ions that are outlet from the ion mobility separator apparatus or product ions that are generated by fragmentation or reaction of the first-generation ions that are outlet from the ion mobility separator apparatus. The ion source may comprise any continuous or quasi-continuous ion source, such as an electrospray ion source, an atmospheric pressure chemical ionization (APCI) source, a matrix-assisted laser desorption/ionization (MALDI) source or otherwise. In an optional step 303, a pre-analysis may be performed in order to determine characteristics of the ions that are received into the ion trap, such as the total quantity of first-generation ions in the trap and the mass-to-charge (m/z) ratios of those ions.

After execution of either step 302 or optional step 303, a subset of the first-generation ions received into the ion trap are selected and isolated (or co-isolated) in step 304 by elimination of ion species that are not of analytical interest. The isolation or co-isolation is performed in a fashion such that the quantity of ions of the subset does not exceed the capacity, C, of an ion mobility separator (IMS) apparatus that is disposed downstream from the ion trap. The elimination of the ion species that are not of analytical interest may be performed, in well-known fashion, by resonant ejection of those ion species. The ion species remaining after the elimination of the unwanted ions may be referred to as either "isolated" or "co-isolated". So-called "isolated" ion species comprise ion species having m/z values that are all within a single m/z range. So-called "co-isolated" ion species comprise ion species having m/z values that are distributed among a plurality of non-overlapping and non-contiguous m/z ranges.

According to some embodiments, the isolation or co-isolation of ion species may comprise a series of fills of the ion trap. After each fill of the ion trap, ions having m/z values that are not of analytical interest are resonantly ejected from the ion trap while ions having other m/z values are retained. Each fill may be followed by a repetition of step 303, in which a portion of the ions are sampled, in order to verify the quantity and/or types of ions remaining in the trap. After one or more repetitions of the fill and ejection steps, the ions remaining in the ion trap have m/z values that are of analytical interest; these m/z values may correspond either to a single isolated m/z range or to multiple, non-overlapping and non-contiguous m/z ranges.

In step 306 of the method 300 (FIG. 9), the isolated or co-isolated subset of the first-generation ions are transferred from the ion trap, as a packet of ions, to an inlet of the downstream ion mobility separator (IMS) apparatus. As the ions enter the IMS apparatus, they begin migrating through the IMS apparatus at different migration rates, based on their respective ion mobility constants, thereby generating a stream of ion-mobility-separated ion species (step 308). As each ion species exits the IMS apparatus, it is transferred downstream to various mass spectrometer components, possibly including components such as the collision cell 14 and mass analyzer 115 that are schematically depicted in FIG. 6. The total time duration required to fully analyze the ions, beginning at the time that ions are released ion trap and ending at the time that the last of the first-generation ions (or the last of the product ions generated from the first-generation ions by fragmentation or other reaction) are mass analyzed may be considered to be the analysis time, $t_4$.

Figure 10:
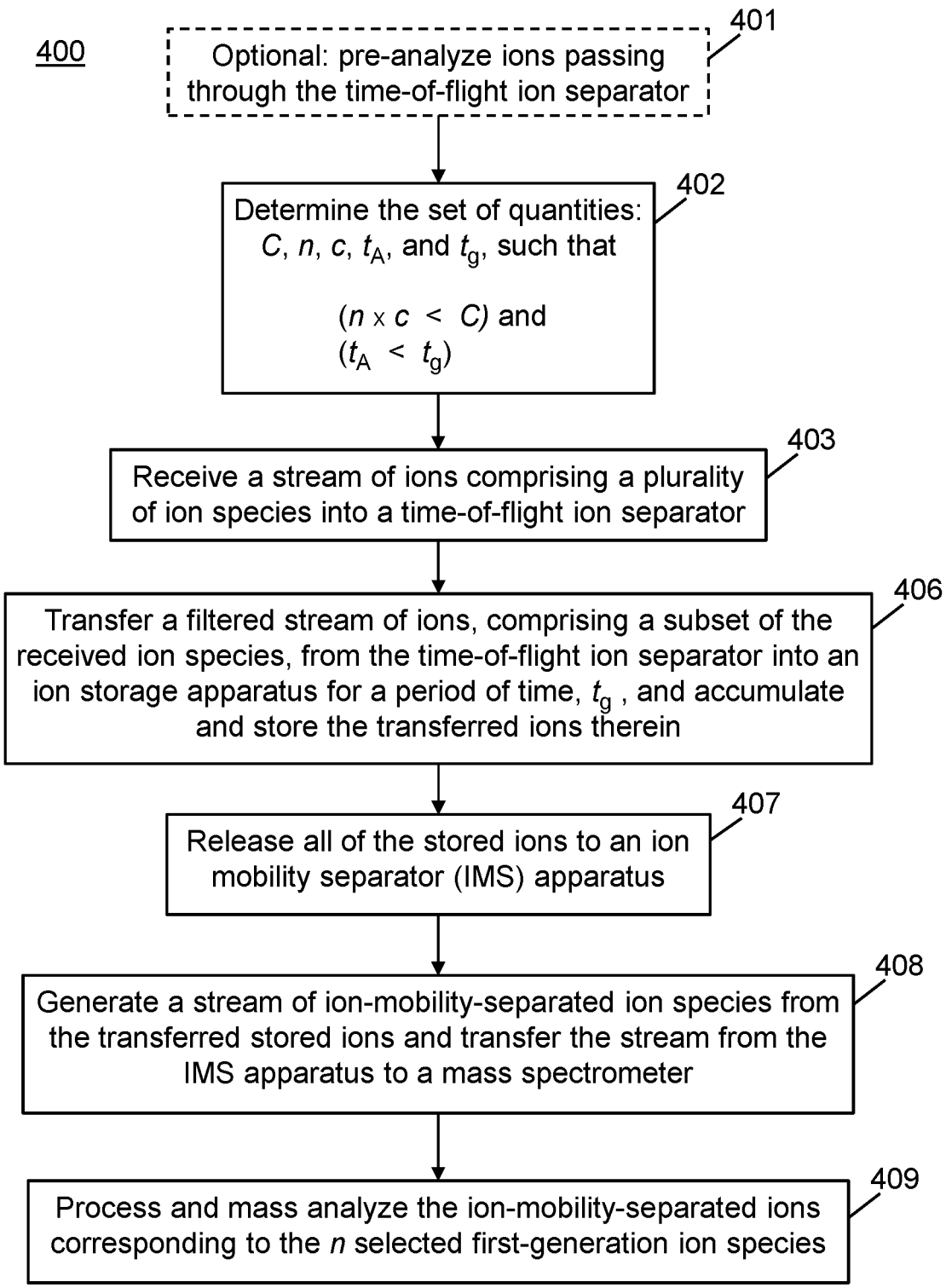
FIG. 10 is a flow diagram of a third method of ion mobility analysis and mass analysis of ions in accordance with the present teachings.

FIG. 10 is a flow diagram of a third method 400 of ion mobility analysis and mass analysis of ions in accordance with the present teachings. The steps 401, 402, 403, 406, 407, 408 and 409 of the method 400 are analogous to the steps 201, 202, 203, 206, 207, 208 and 209 of the method 200, respectively, except that, whereas the steps of the method 200 pertain to operation of a system comprising a mass filter, the steps of the method 400 pertain to operation of a system comprising a time-of-flight (TOF) ion separator, the output of which is controlled by an ion gate that is operated in coordination with the pulsing operation of an accelerator at the TOF separator's inlet (see FIG. 7). In either instance, the output of the device—either mass filter or TOF separator—is a stream of ions that is filtered in the sense that ion species having m/z values that are not of analytical interest are removed from the stream, thereby enhancing the relative concentrations of the ion species that are of interest in the accumulated output of the filtered stream, as accumulated in a downstream holding cell.

The apparatuses and methods described herein are general, and many different instrument configurations could be imagined that may be operated according to Eqs. 1 and 2. For example, according to various embodiments, the fragmentation cell and the mass analyzer may be combined together into a single device (e.g., a dual-pressure mass analyzer as described in U.S. Pat. No. 7,692,142). According to various embodiments, the mass analyzer may comprise an ion trap mass analyzer, a time-of-flight (TOF) or another type of mass analyzer. Further, although methods of the invention have been described in terms of optimization of efficiency and sensitivity of mass spectrometer systems that include an ion storage cell that temporarily stores ions and then transfers the ions to an ion mobility separator apparatus, such description is not intended to imply that an ion mobility separator apparatus need be present in order to successfully practice those methods. For example, an additional mass filter (not shown) or time-of-flight ion separator may be disposed between the outlet of the ion mobility separator apparatus 17 and the inlet of the fragmentation or reaction cell 14 (e.g., FIG. 2) in order to further eliminate potential interfering ion species prior to fragmentation. More generally, the methods taught herein are also applicable to systems in which an ion storage cell transfers temporarily stored ions to any type of mass spectrometry apparatus or component device. Various other modifications of the invention, in addition to those shown and described herein will become apparent to those skilled in the art from the foregoing description and accompanying drawings. Such modifications and other modifications are intended to fall within the scope of the appended claims. Any patents, patent applications, patent application publications or other literature mentioned herein are hereby incorporated by reference herein in their respective entirety as if fully set forth herein, except that, in the event of any conflict between the incorporated reference and the present specification, the language of the present specification will control.

What is claimed is:

1. A mass spectrometer system, comprising:
   (a) an ion source;
   (b) a mass filter or a time-of-flight (TOF) ion separator configured to receive a stream of first-generation ions from the ion source, wherein the mass filter or TOF ion separator has a transmission curve that comprises more than one maximum, as a function of mass-to-charge ratio (m/z);
   (c) an ion storage device having an ion inlet configured to receive a stream of filtered ions comprising a plurality of ion species from the mass filter or TOF separator and to accumulate the plurality of ion species therein;
   (d) an ion mobility cell having an ion inlet configured to receive an accumulated batch of ion species from the ion storage device and an ion outlet configured to release, one at a time, the individual ion species therefrom; and
   (e) a mass analyzer configured to receive and mass analyze each first-generation ion species or each fragment ion species generated by fragmentation or other reaction of the various first-generation ion species.

2. A mass spectrometer system as recited in claim 1, further comprising:
   (f) a fragmentation cell configured to receive, one at a time, the individual ion species released from the trapped ion mobility cell and to generate a respective plurality of fragment-ion species therefrom.

3. A mass spectrometer system as recited in claim 2, further comprising an additional mass filter or time-of-flight ion separator disposed between the ion mobility cell and the fragmentation cell.

4. A mass spectrometer system as recited in claim 1, wherein the mass filter or TOF separator is configured to transmit a single packet of ions to the ion storage device, wherein the packet of ions comprises a single mass-to-charge ratio (m/z) range that is reduced relative to an m/z range generated by the ion source.

5. A mass spectrometer system as recited in claim 1, wherein the mass filter or TOF separator is configured to transmit a single packet of ions to the ion storage device, wherein the packet of ions comprises ion species that are distributed among multiple, non-contiguous, non-overlapping mass-to-charge ratio (m/z) ranges.

6. A mass spectrometer system as recited in claim 1,
   wherein the mass filter or TOF separator is configured to transmit a series of packets of ions to the ion storage device, wherein each packet of ions comprising a respective mass-to-charge ratio (m/z) range, the plurality of m/z ranges being non-contiguous and non-overlapping, and
   wherein the ion storage device is configured to co-accumulate the ions of the series of packets.

7. A mass spectrometry method, comprising:
   receiving ions into an ion trap of a mass spectrometry system;
   selecting and isolating a subset of the ions received ions using the ion trap;
   transferring the isolated subset of the ions from the ion trap to an inlet of an ion mobility separator apparatus of the mass spectrometry system;
   transferring a stream of ion-mobility-separated ions from the ion mobility separator to a mass analyzer of the mass spectrometry system, said ion-mobility-separated ions generated from the isolated subset of the ions by the ion mobility separator; and
   mass analyzing the ion-mobility-separated-ions.

8. A method for operating a mass spectrometer system, comprising:
  receiving a stream of ions comprising a flux, f, of ions into a mass filter of the mass spectrometer system, the stream of ions comprising n ion species of interest;
  filtering the stream of ions using the mass filter and transferring a filtered stream of the ions that includes the n ion species of interest from the mass filter into an ion storage apparatus of the mass spectrometer system and accumulating the transferred ions therein, wherein the transfer is performed for a predetermined transfer time period of duration, $t_g$;
  transferring the stored ions from the ion storage apparatus to an ion mobility separator of the mass spectrometer system;
  transferring a stream of ion-mobility-separated ions from the ion mobility separator to a mass analyzer of the mass spectrometer system, said ion-mobility-separated ions generated from the stored ions; and
  processing and mass analyzing a portion of the ion-mobility-separated-ions that comprise the n ion species of interest, wherein the processing and mass analyzing is performed for an analysis time period of duration, $t_A$, where $t_A < t_g$.

9. A method for operating a mass spectrometer system as recited in claim 8, comprising, during the analysis time period:
  receiving a second stream of ions comprising the flux, f, of ions into the mass filter, the second stream of ions comprising the n ion species of interest; and
  filtering the second stream of ions using the mass filter and transferring a second filtered stream of the ions that includes the n ion species of interest from the mass filter into the ion storage apparatus and accumulating the transferred ions therein, wherein the transfer is performed for a second predetermined transfer time period of duration, $t_g$.

* * * * *